March 8, 1960    W. E. POHL    2,927,857
METHOD OF MAKING COLORED PICTURES
Filed Sept. 24, 1956

Inventor
Wadsworth E. Pohl
by Roberts, Cushman & Grover
Attys

United States Patent Office 2,927,857
Patented Mar. 8, 1960

2,927,857

METHOD OF MAKING COLORED PICTURES

Wadsworth E. Pohl, Los Angeles, Calif., assignor to Technicolor Corporation, Hollywood, Calif., a corporation of Maine Application September 24, 1956, Serial No. 611,700

3 Claims. (Cl. 96—2)

This invention relates to the production of multi-color pictures from black and white or monochrome originals, and particularly to the coloring of motion pictures.

According to the invention, the multi-color picture is produced from an original transparent picture by projecting an image of the original on a sheet of material suitable for coloring, coloring the sheet generally in accordance with the color of the different objects in the scene, and thereafter photographing the color sheet on color film with the monochrome original in contact with the sensitive film, thereby obtaining a record containing color and detail.

Figure 1:
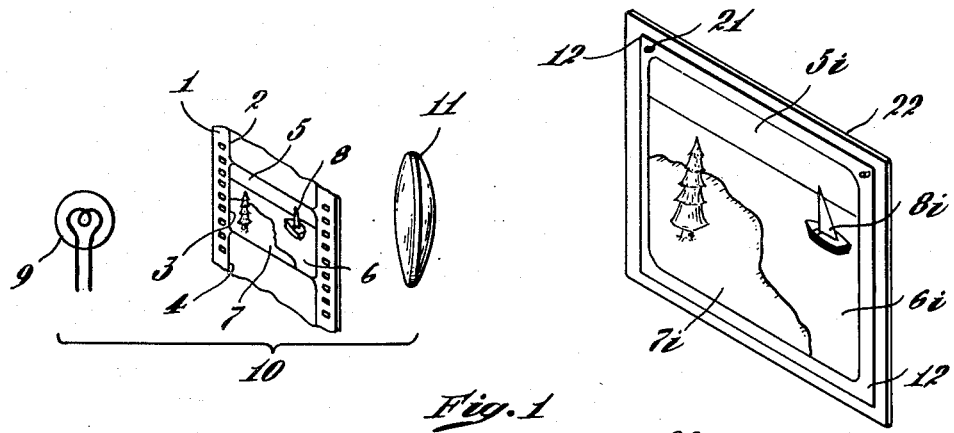
Figure 2:
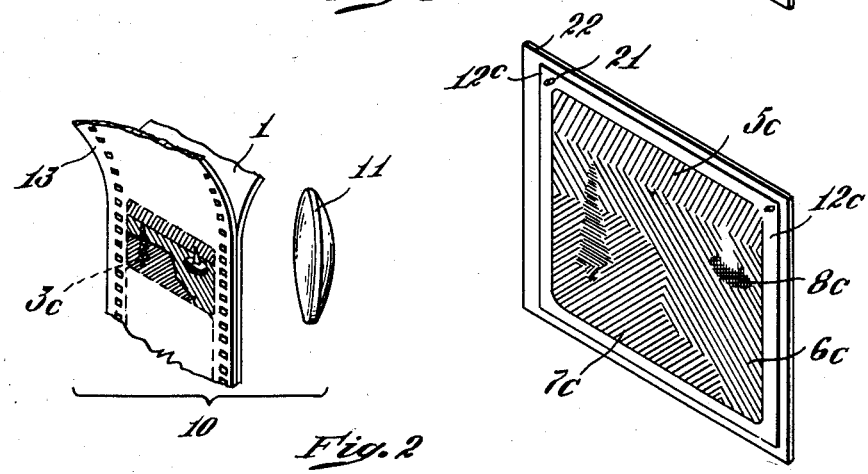
Figure 3:
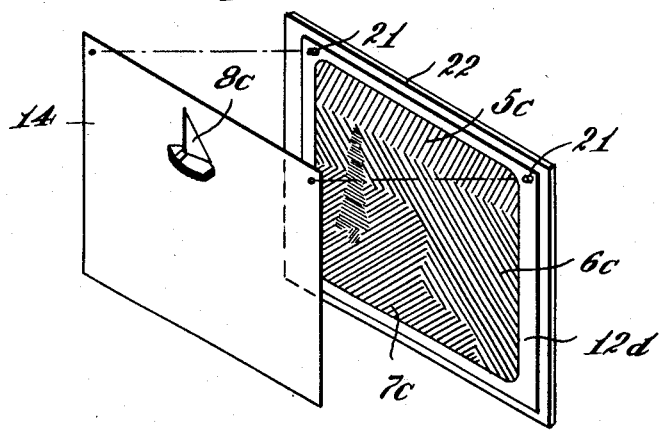

For the purpose of illustration typical embodiments of the invention are shown in the accompanying drawings wherein Figs. 1 and 2 are diagrammatic views illustrating projecting and photographing steps of the method; and Fig. 3 is a like view showing a modification of the method.

As shown in Fig. 1, the method is carried out with a black and white positive motion picture film strip 1 having a series of successive frames 2, 3, 4 in which are recorded a picture having fixed detail such as sky 5, water 6, and foreground 7, and moving detail such as a boat 8. By means of a light source 9 and a suitable projection lens 11 of a projector-camera 10 one frame 3 of the black and white picture is projected on a sheet of white paper 12, whereon black and white images of the sky 5i, water 6i, foreground 7i and boat 8i appear. The sheet is registered by pins 21 on an easel 22.

While the image is so projected solid colors are uniformly painted or blocked in the general areas of the different objects of the scene. When the coloring is completed, the colored sheet 12c of Fig. 2 has uniformly colored areas 5c—8c without detail or shading. As is indicated by the crosshatching, the areas 5c—8c receive various appropriate colors.

The colored sheet is then photographed through the lens 11 of the projector-camera 10 onto sensitive color stock 13, with the same frame 3 of the original picture 1 in contact with the sensitive stock 13. The recorded picture 3c on the stock 13 will, after conventional color development, be a record having both color and detail, the color being derived from the sheet 12c and the detail and shading from the original transparency 1. The resulting record appears as though it had been photographed in natural color. Preferably, the film 1 is a black and white positive record while the sensitive stock 13 is color negative.

The projector-camera 10 may be a conventional bipack camera modified by adding a suitable light source 9. It is, of course, provided with the usual aperture and intermittent movement for projecting the series of picture frames 2, 3, 4, etc., on the sheet 12, and subsequently feeding the sensitive stock 13 and original film 1 in contact past the aperture as a series of corresponding colored sheets 12c are located on the easel 22.

If the background and foreground detail 5—7 is static for a number of frames, the single sheet 12d of Fig. 3 may be colored with the moving detail 8c omitted. The moving detail which changes with each frame is then colored on a series of transparent sheets 14 superposed over the colored sheet 12d. Opaque pigment is used to mask the colored area of the background on the sheet 12d. Successive transparent sheets 14 are then photographed while registered in contact with the sheet 12d on the easel 22.

It should be understood that the present disclosure is for the purpose of illustration only and that this invention includes all modifications and equivalents which fall within the scope of the appended claims.

I claim:

1. The method of producing a multi-color motion picture from a transparent monochrome original motion-picture film which comprises projecting an image from the original film on one side of a sheet of colorable material, uniformly painting the areas of the sheet occupied by different objects of the scene different colors in accordance with the color of the different objects respectively, with light reflected from said side photographing the colored sheet on sensitive motion-picture color film with the monochrome original film in contact with the sensitive film behind an aperture, feeding the two films past the aperture step by step, and replacing said sheet with a series of correspondingly colored sheets between steps, thereby to obtain a multi-color motion-picture film containing color and detail.

2. The method of producing a multi-color motion picture from a transparent monochrome original motion-picture film having static and moving detail which comprises projecting an image from the original film on one side of a sheet of colorable material, uniformly painting the areas of the sheet occupied by different objects of the scene different colors in accordance with the color of the different objects respectively, superimposing on said line a transparent, colorable sheet over the first said sheet and coloring the moving detail on said transparent sheet with opaque material, with light reflected from said side photographing the colored sheet on sensitive motion-picture color film with the transparent sheet so superimposed and with the monochrome original film in contact with the sensitive film behind an aperture, feeding the two films past the aperture step by step, and replacing said sheets with a series of correspondingly colored sheets between steps, thereby to obtain a multi-color motion-picture film containing color and detail.

3. The method of producing a multi-color motion-picture from a transparent monochrome original film which comprises projecting an image from the original film through an optical system on one side of a sheet of colorable material, painting the areas of the sheet occupied by different objects of the scene different colors in accordance with the color of the different objects respectively, with light reflected from said side photographing the colored sheet on sensitive motion-picture color film with the same optical system and with the monochrome original film in contact with the sensitive film behind an aperture, feeding the two films past the aperture step by step, and replacing said sheet with a series of correspondingly colored sheets between steps, thereby to obtain a multi-color motion-picture film containing color and detail.

References Cited in the file of this patent

UNITED STATES PATENTS

| | | |
|---|---|---|
| 1,102,902 | Gamble | July 7, 1914 |
| 1,464,054 | Williams | Aug. 7, 1923 |
| 1,861,515 | Williams | June 7, 1932 |
| 2,127,829 | O'Brien | Aug. 23, 1938 |
| 2,433,811 | Haff | Dec. 30, 1947 |
| 2,543,706 | Pohl | Feb. 27, 1951 |

UNITED STATES PATENT OFFICE
CERTIFICATION OF CORRECTION

Patent No. 2,927,857                            March 8, 1960

Wadsworth E. Pohl

It is hereby certified that error appears in the above numbered patent requiring correction and that the said Letters Patent should read as corrected below.

Column 2, line 36, for "line" read -- side --.

Signed and sealed this 15th day of August 1961.

(SEAL)
Attest:

ERNEST W. SWIDER                              DAVID L. LADD

Attesting Officer                                Commissioner of Patents